United States Patent [19]
Hahn et al.

[11] Patent Number: 5,195,612
[45] Date of Patent: Mar. 23, 1993

[54] LUBRICATION SYSTEM FOR A COTTON HARVESTER

[75] Inventors: Robert W. Hahn, Lemont; Alan H. Ludwig, Hinsdale; G. Neil Thedford, Naperville, all of Ill.

[73] Assignee: Case Corporation, Racine, Wis.

[21] Appl. No.: 884,028

[22] Filed: May 18, 1992

[51] Int. Cl.$^5$ ............................................. F01M 1/18
[52] U.S. Cl. ..................................... 184/6.4; 184/6.1; 184/7.4; 184/108; 56/10.2; 56/28; 364/505
[58] Field of Search ................... 184/6.1, 6.4, 108, 7.4, 184/7.3, 7.2; 56/10.2, 28, 12.3; 364/551.02, 509, 550, 505

[56] References Cited

U.S. PATENT DOCUMENTS

| | | | |
|---|---|---|---|
| 2,742,978 | 4/1956 | Peterson et al. | 184/7.4 |
| 3,031,032 | 4/1962 | Dinkelkamp et al. | 184/7.4 |
| 3,678,631 | 7/1972 | Payne et al. | 184/6.4 |
| 4,326,603 | 4/1982 | Darrow et al. | 364/505 |
| 4,376,298 | 3/1983 | Sokol et al. | 56/10.2 |
| 4,445,168 | 4/1984 | Petryszyn | 184/6.1 |
| 4,520,902 | 6/1985 | Snow | 184/7.4 |
| 4,666,375 | 5/1987 | Kime | 417/46 |
| 4,769,978 | 9/1988 | Reichen et al. | 56/12.3 |
| 4,787,479 | 11/1988 | Ostermeyer et al. | 184/7.2 |
| 4,840,018 | 6/1989 | Deutsch | 56/12.3 |
| 4,918,585 | 4/1990 | Miller et al. | 364/509 |
| 4,969,318 | 11/1990 | Hudson et al. | 184/6.1 |
| 5,018,343 | 5/1991 | Finke | 56/12.3 |
| 5,137,117 | 8/1992 | Mangen et al. | 184/6.1 |

FOREIGN PATENT DOCUMENTS

2229990 4/1984 Fed. Rep. of Germany.

Primary Examiner—Ira S. Lazarus
Assistant Examiner—Alan B. Cariaso
Attorney, Agent, or Firm—Dressler, Goldsmith, Shore, Sutker & Milnamow, Ltd.

[57] ABSTRACT

A lubrication system for a cotton harvester having a plurality of harvesting units. The lubrication system comprises a lubricant source for providing pressurized lubricant to each of the harvesting units to facilitate their operation and a control mechanism for measuring cyclic operations of harvesting units operating components during a harvesting procedure. The control mechanism controls operation of the lubricant source such that the amounts of lubricant provided to the harvesting units during a lubrication cycle is correlated to the lubricant usage of the harvesting units during the harvesting procedure. A salient feature of the present invention relates to a display for visually indicating the cyclic operations remaining for the harvesting units before another lubrication cycle is due to be commenced. The display furthermore provides a visual indication relating to the operating performance of the lubrication system.

16 Claims, 5 Drawing Sheets

Fig_2_

LUBRICATION SYSTEM FOR A COTTON HARVESTER

FIELD OF THE INVENTION

The present invention generally relates to cotton harvesters and, more particularly, to an improved lubrication system for providing proper amounts of lubricant to mechanisms arranged on harvesting units of the cotton harvester.

BACKGROUND OF THE INVENTION

A typical cotton harvester includes two or more harvesting units for harvesting cotton from rows of cotton plants during a harvesting procedure. Each harvesting unit includes a rotatable harvesting mechanism comprised of multiple inter-related and lubricated parts. A typical harvesting unit includes a pair of picker rotor assemblies with doffer assemblies arranged in combination therewith. Each picker rotor assembly includes a series of picker bars which oscillate about individual upright axes. Each picker bar has a plurality of rotatably driven picker spindles arranged thereon one above the other. A driving arrangement within the harvesting unit transmits rotary motion from an input drive shaft to the picker rotor assemblies to drive the picker bars along a predetermined path of travel while concurrently rotating the picker spindles.

As is conventional, lubricant between interrelated parts of the harvesting unit reduces friction and wear of the operating mechanisms. To inhibit premature wear and possible failure of the component parts of the operating mechanisms, therefore, lubrication of the harvesting units is scheduled on a regular basis. The number of areas on each harvesting unit requiring lubricant coupled with limited operator accessibility to such areas causes lubrication of the harvesting units to be a time consuming and laborious effort. Such effort is further intensified when up to five harvesting units on a single harvester require lubrication during each lubrication cycle.

During a harvesting procedure, the operator has many and varied concerns relating to overall operation of the harvester. Lubricant is exhausted from the harvesting mechanism during the harvesting procedure. As will be appreciated, therefore, the quantity or amount of lubricant provided to the various mechanisms during a lubrication cycle will substantially determine the duration or how many consecutive operative cycles can be accomplished before lubrication of the component parts of the harvesting unit is required.

Even the most experienced harvester operators find it difficult to accurately measure the remaining harvesting units operating or harvesting time before the next lubrication cycle is scheduled for the harvesting mechanisms. Misjudgments are often costly and expensive.

Proper lubrication of the various component parts of each harvesting unit is further complicated in that the harvesting mechanisms on the harvesting units are typically intermittently operated in varying work cycles during a harvesting procedure. As will be appreciated, harvesters operating under different crop conditions require different lubricant procedures. As will be appreciated, under ideal or good harvesting conditions, the harvesting mechanisms may be continuously operated during the day. In less than ideal conditions, however, the harvesting mechanisms may be intermittently operated during the day. Of course, a harvester having harvesting mechanisms operated under a 100% duty cycle during harvesting operations will require more lubricant than a harvester wherein the harvesting units were operated under a 50% duty cycle during the operational cycle of the harvesting units. Moreover, the provision of too much lubricant in certain areas of the harvester can contaminate the spindles and harvested cotton. On the other hand, too little lubricant can reduce the life of relatively expensive components and increase downtime for the harvester.

Thus, there is a need and a desire for a lubrication system which reduces the time and effort required to properly and accurately lubricate the harvesting units of a cotton harvester while providing an indication of the harvesting mechanism operating time remaining before the next lubrication cycle is required for the harvesting units.

SUMMARY OF THE INVENTION

In view of the above, and in accordance with the present invention, there is provided an improved lubrication system for a cotton harvester having a plurality of harvesting units. Each harvesting unit on the harvester includes a harvesting mechanism which is intermittently operated during a harvesting process or procedure. The lubrication system of the present invention comprises a lubricant source for providing pressurized lubricant to each of the harvesting mechanisms to facilitate their operation during a harvesting procedure and a control mechanism for measuring cyclic operations of the harvesting mechanisms during the harvesting procedure of the cotton harvester. The control mechanism controls operation of the lubricant source such that the amounts of lubricant provided to the harvesting mechanisms during the lubrication cycle is correlated to the lubricant usage of the harvesting mechanisms during the harvesting procedure. A salient feature of the present invention concerns a display for visually indicating the cyclic operations remaining for the harvesting mechanisms before another lubrication cycle is due to be commenced for the harvesting units.

In the illustrated embodiment, the source of pressurized lubricant includes a pump having an inlet connected to a reservoir and an outlet connected to each of the harvesting units such that lubricant is provided to the harvesting mechanisms on each harvesting unit. The lubricant pump is driven by a hydraulically driven motor whose operation is regulated by the lubricant system control mechanism. As will be appreciated, the duration of pump operation is correlated to the accumulated intermittent operations of the lubricated mechanisms as computed by the lubrication system control mechanism.

The control mechanism of the lubrication system includes manually settable means for conditioning the control mechanism into various modes of operation. When set to an "Automatic" mode of operation, the control mechanism automatically activates the lubricant source after the harvesting mechanisms have accumulated a predetermined number of operating cycles. When set to a manual mode of operation, the control mechanism is conditioned to provide a signal that a lubrication cycle is required after the harvesting mechanisms have accumulated operating time of a predetermined duration. A third setting for the settable means conditions the control mechanism to operate the source of lubricant for an intermediate period of time selected by the operator through manipulation of the settable means. The lubrication system of the present invention further includes means for providing an audible alarm when a lubrication cycle is to be performed, and the settable means are set to condition the control mechanisms for other than an automatic mode of operation.

The control mechanism of the lubrication system further includes programmable means for setting the duration of the lubrication cycle. As will be appreciated, changing the duration of the lubrication cycle will likewise modify the duration of the accumulated operating cycles for the harvesting mechanisms between lubrication cycles.

The outlet of the lubricant source is preferably connected to each harvesting unit through a lubricant distribution system which directs substantially equal amounts of lubricant to each harvesting unit. A series of common lines direct pressurized lubricant from the outlet of the lubricant source to a distribution point on each harvesting unit from whence pressurized lubricant is directed to various lubricant receiving areas on each harvesting unit.

With the present invention, a visual display is provided to enable the operator to make an informed judgment of the remaining operating time for the harvesting units before a lubrication cycle is due to be provided for the harvesting units. In a preferred form of the invention, the display furthermore provides an indication of the operating performance of the lubrication system. As an example, if the pump assembly fails to operate, the visual indicator reflects a display indicative of a pump assembly problem. Similarly, if there is insufficient pressure in the lubricant distribution system, the visual indicator reflects a display indicative of a pressure problem within the lubrication system. Thus, the operator can quickly and easily foresee the extent of operating time remaining for the harvesting units and can readily tell if the system is operating properly throughout the harvesting procedure.

Numerous other features and advantages of the present invention will become readily apparent from the following detailed description, the accompanying drawings, and the appended claims.

DETAILED DESCRIPTION OF THE PRESENT INVENTION

While the present invention is susceptible of embodiment in various forms, there is shown in the drawings, and will hereinafter be described, a presently preferred embodiment of the invention, with the understanding that the present disclosure is to be considered as an exemplification of the invention, which is not intended to limit the invention to the specific embodiment illustrated.

Figure 1:
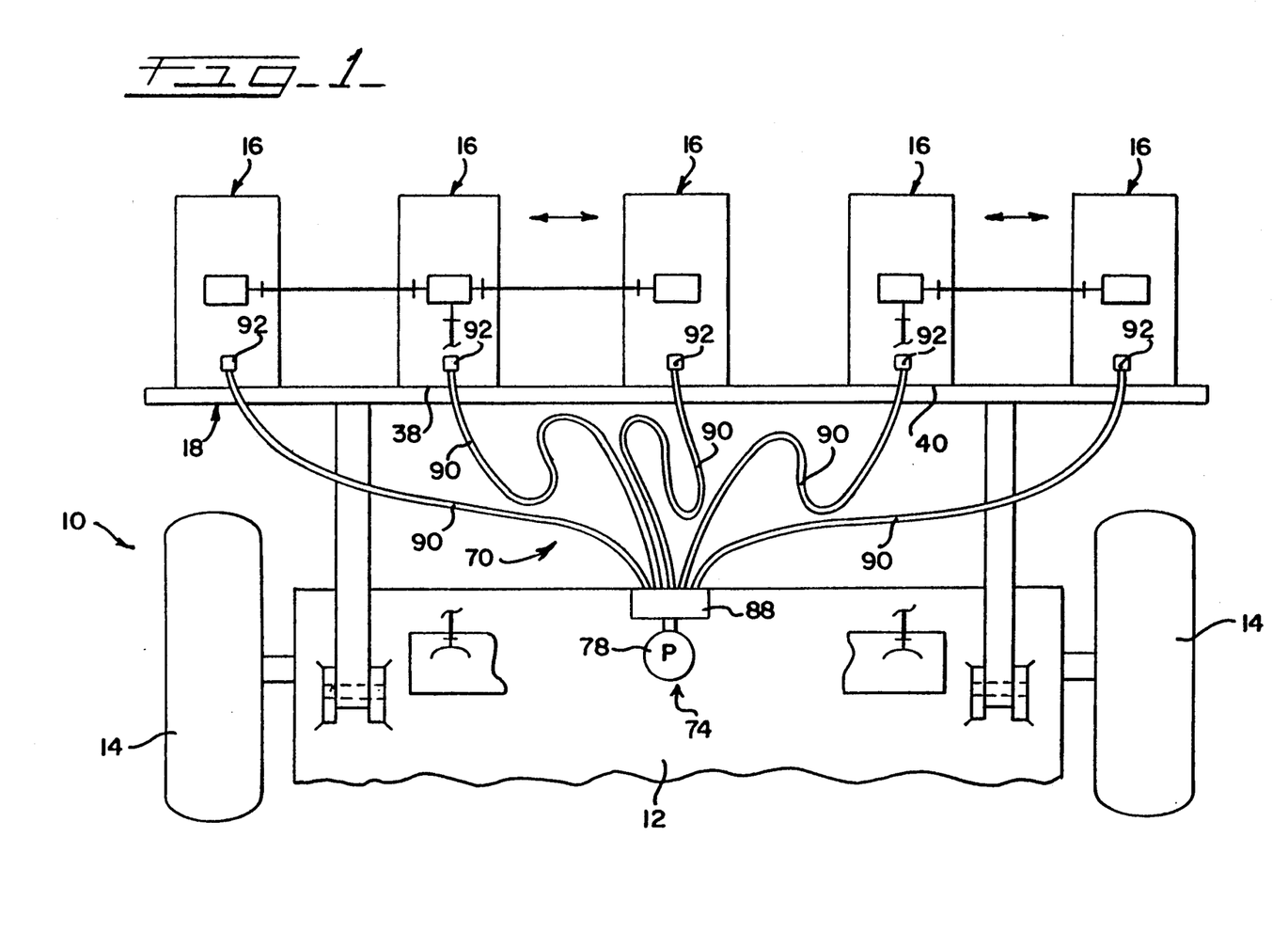
FIG. 1 is a schematic plan view of a cotton harvester incorporating a system for lubricating various harvesting units on the harvester.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of ground engaging front drive wheels 14 and a pair of rear steerable wheels (not shown).

Positioned forwardly on the frame 12 are a plurality of individual cotton harvesting units 16. The harvesting units are preferably arranged side-by-side across a front end of the harvester and are laterally spaced apart a distance substantially corresponding to the distance between adjacent plant rows. The harvesting units are of generally like construction and, thus, only one harvesting unit will be described in detail, with the understanding that the other harvesting units are similarly constructed.

Figure 2:
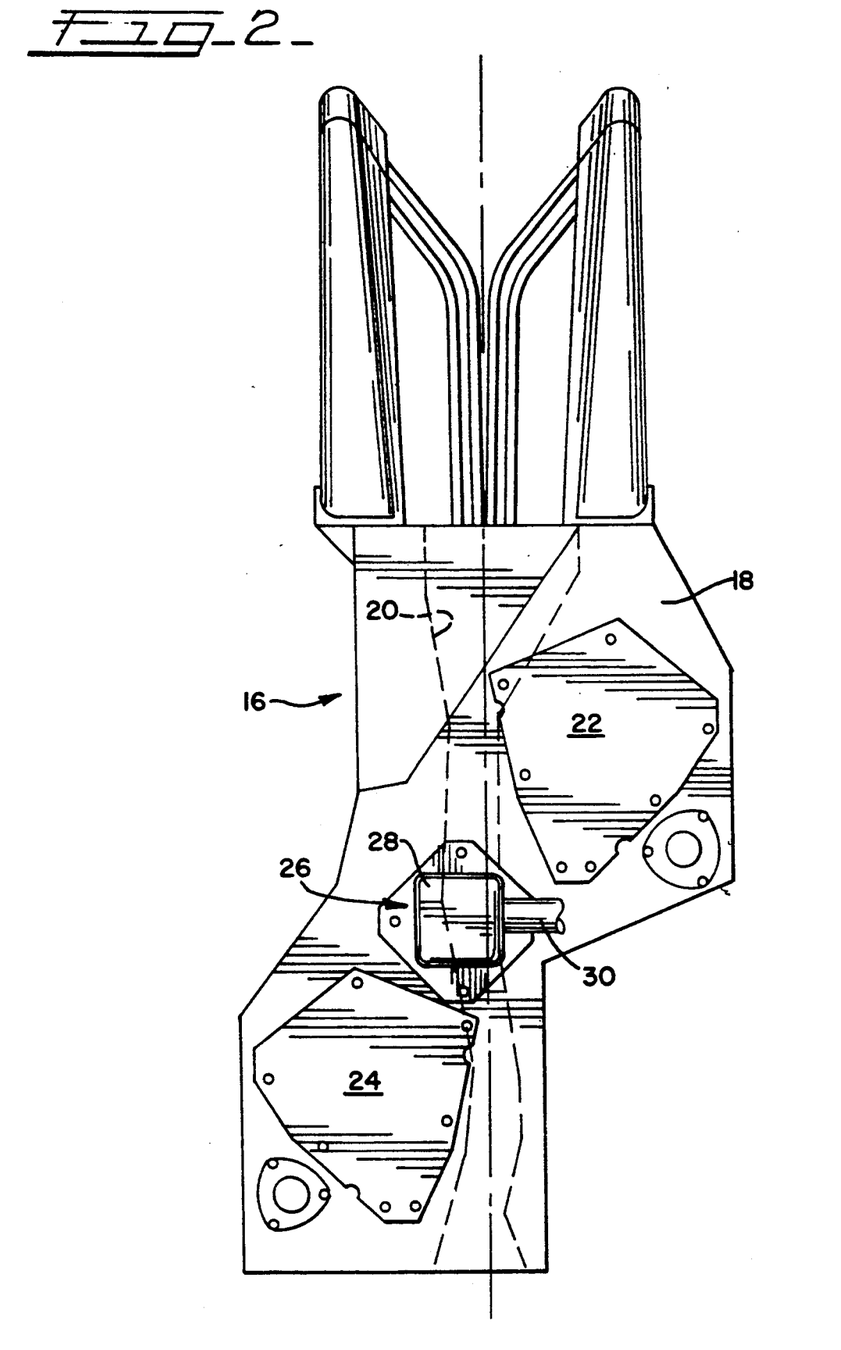
FIG. 2 is an enlarged plan view of a harvesting unit of the cotton harvester.

As illustrated in FIG. 2, each harvesting unit 16 includes a housing assembly 18 defining a fore-and-aft crop receiving opening or passage 20 which allows a plant row to pass therethrough. Each harvesting unit is further provided with a rotatable harvesting mechanism for removing cotton from a row of cotton plants passing through the harvesting unit.

In a preferred embodiment, the harvesting mechanism includes front and rear picker rotor assemblies 22 and 24, respectively. Each picker rotor assembly 22, 24 is adapted to orbit along a predetermined path of travel within the housing assembly and alongside the plant passage 20. The picker rotor assemblies 22, 24 are conjointly driven in timed relation to each other by drive assembly 26 mounted at an upper end of the housing assembly 18 and which preferably includes a gear box 28 which is driven by a harvesting unit drive shaft 30.

The picker rotor assemblies 22 and 24 are substantially similar in construction to each other. Accordingly, only picker rotor assembly 22 will be described in detail, with the understanding that the picker rotor assembly 24 is similarly constructed.

Figure 3:
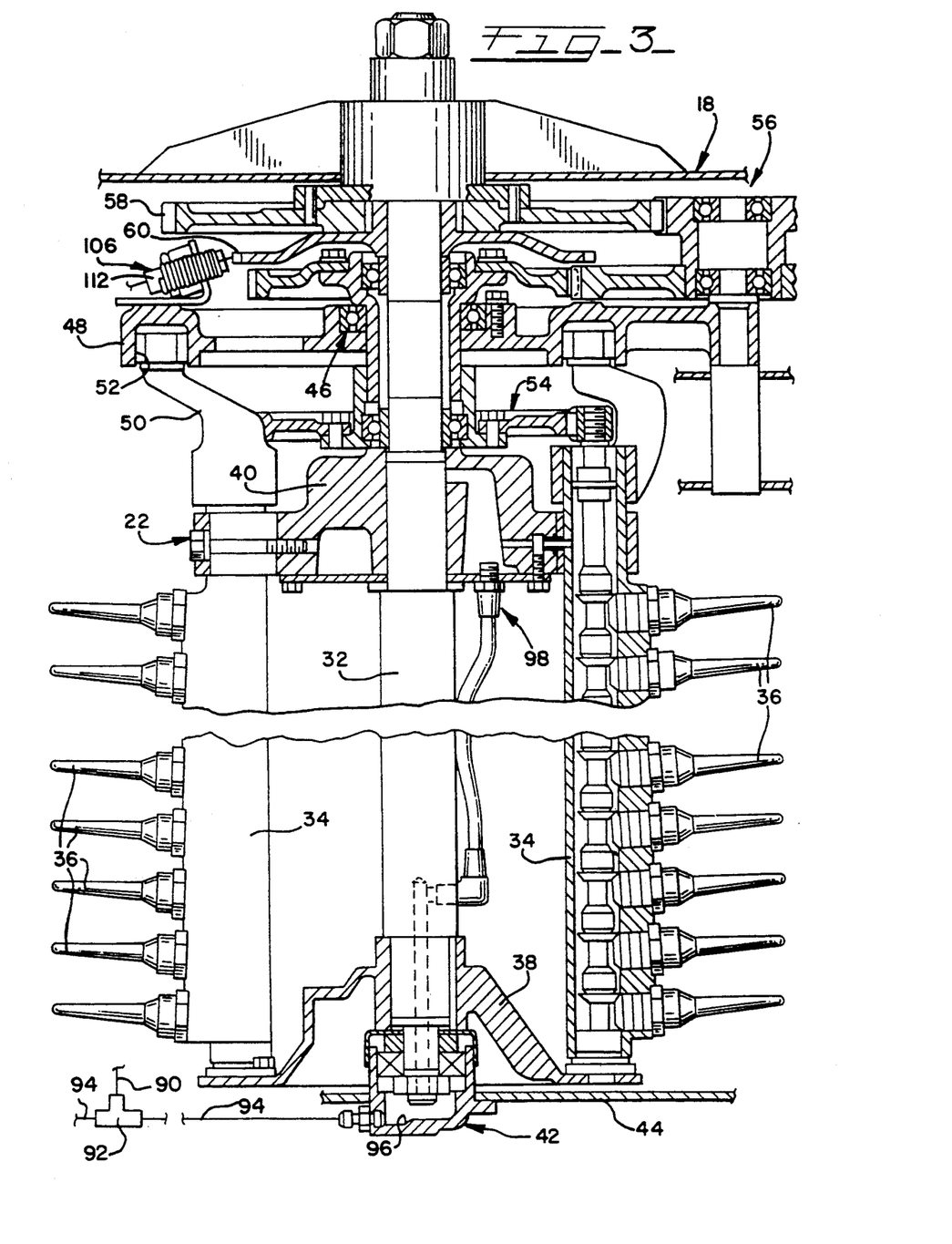
FIG. 3 is a longitudinal sectional view of a picker rotor assembly of a harvesting unit.

As shown in FIG. 3, each picker rotor assembly comprises an upright drive shaft 32, a plurality of upright and hollow picker bars 34 peripherally arranged about the respective rotor assembly, a plurality of vertically spaced and rotational picker spindles 36 and other rotor components.

As shown, the drive shaft 32 is provided with lower and upper support members 38 and 40, respectively, radially extending from and connected for rotation with the shaft 32. The lower support member 38 is rotatably mounted on an upstanding bearing support 42 which is suitably secured to a bottom wall 44 of the housing assembly 18. Above the upper support member 40, drive shaft 32 is rotatably supported by a bearing 46 on a stationary cam 48 which is secured to the housing assembly 18 in the usual manner.

Each picker bar 34 rotates about the axis of the drive shaft 32 and oscillates about its own vertical axis. As illustrated, opposite ends of each picker bar 34 are rotatably supported by the lower and upper support members 38 and 40, respectively. A crank arm 50 extends from the upper end of each picker bar 34. The free end of each crank arm rides in a cam track 52 defined by the stationary cam 48 to move each picker bar and the picker spindles carried thereby along a predetermined path of travel as the rotor assembly is rotatably driven about the axis of drive shaft 32. A spindle drive mechanism 54 rotatably and individually drives the picker spindles 36 extending from the picker bars 34.

Each picker rotor assembly, including drive shaft 32, picker bars 34, and picker spindles 36 is driven by a drive mechanism 56 which derives power from the drive assembly 26 (FIG. 2). Mechanism 56 includes an input drive gear 58 arranged toward an upward end of the rotor assembly. As shown, the input drive unit 58 is rotatably is mounted on a monitoring sprocket 60 which is keyed to the drive shaft 32 of the rotor assembly for rotation therewith. Thus, the rotation of sprocket 60 is directly correlated to operation of the harvesting mechanism on each harvesting unit.

To facilitate operation of the harvesting units, a lubrication system is provided for supplying lubricant, such as grease, to various grease receiving areas on the harvesting units. The lubrication system hereinafter described is particularly concerned with providing proper amounts of lubricant to the harvesting mechanisms of the harvesting units. It should be appreciated, however, that the teachings of the present invention are equally applicable to lubrication systems which provide measured amounts of lubricant to other grease receiving areas of a machine having lubricated components whose operational duration is commensurate with the amount of lubricant provided thereto. The lubrication system of the present invention is indicated generally by reference numeral 66 in FIG. 4. Lubrication system 66 preferably includes a source of pressurized lubricant 68, a lubricant distribution system 70, and a lubricant controller 72 for controlling operation of the pressurized lubricant source 68 and thereby controlling the flow of lubricant to the grease receiving areas of the harvesting units 16 (FIG. 1).

Figure 4:
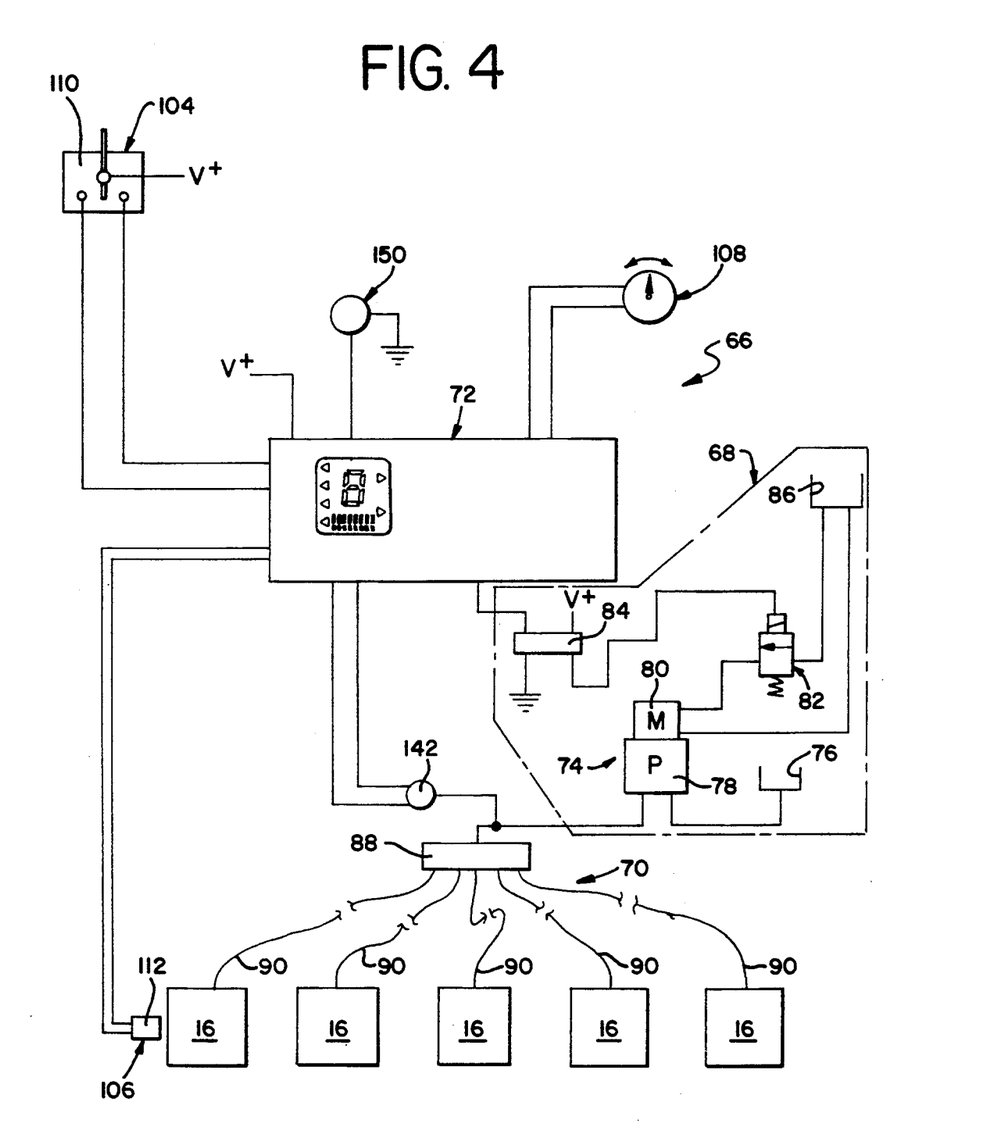
FIG. 4 is a schematic illustration of the lubrication system including digital display means associated therewith.

As shown, the source of pressurized lubricant 68 includes a pump assembly 74 connected to a lubricant reservoir 76. Pump assembly 74 is preferably mounted on the frame 12 (FIG. 1) of the harvester. Input port of pump assembly 74 is connected to the lubricant reservoir 76, also located on the harvester, preferably above the pump assembly 74. Output port of pump assembly 74 is connected to the lubricant distribution system 70.

In the illustrated embodiment, pump assembly 74 includes a constant displacement gear pump 78 which is driven by a hydraulically powered motor 80. Operation of the motor 80 and, thereby, operation of the pump assembly 74 is regulated by an electrically energizable mechanism such as a solenoid valve 82 which is responsive to a relay 84. As shown, the solenoid valve 82 controls the supply of pressurized hydraulic fluid from a hydraulic system on the harvester that includes a hydraulic reservoir 86 mounted on the harvester frame.

The lubricant distribution system 70 distributes substantially equal amounts of lubricant from the pump assembly 74 to corresponding lubricant receiving areas on each harvesting unit 16. In the illustrated embodiment, the lubricant distribution system 70 preferably includes a manifold 88 connected to the outlet of pump assembly 74. The manifold 88 has a series of common lines 90 extending therefrom to each of the harvesting units. As shown in FIG. 3, at each harvesting unit, the common line 90 leading thereto is connected to a T-fitting 92 carried on the housing assembly 18. Conduits 94 extend from the T-fitting 92 to the front and rear picker rotor assemblies 22 and 24, respectively, of each harvesting unit.

In the preferred embodiment, the bearing support 42 at the lower end of each picker rotor assembly defines a lubricant receiving chamber 96 which is connected to and receives lubricant from a conduit 94. In the illustrated embodiment, lubricant passes from chamber 96 through a spindle lubrication system 98. The details of the spindle lubricant system are fully set forth in co-assigned U.S. Pat. No. 4,972,663 entitled "COTTON PICKER SPINDLE LUBRICATION SYSTEM." Therefore, the details of the spindle lubrication system will not be set forth herein.

Figure 5:
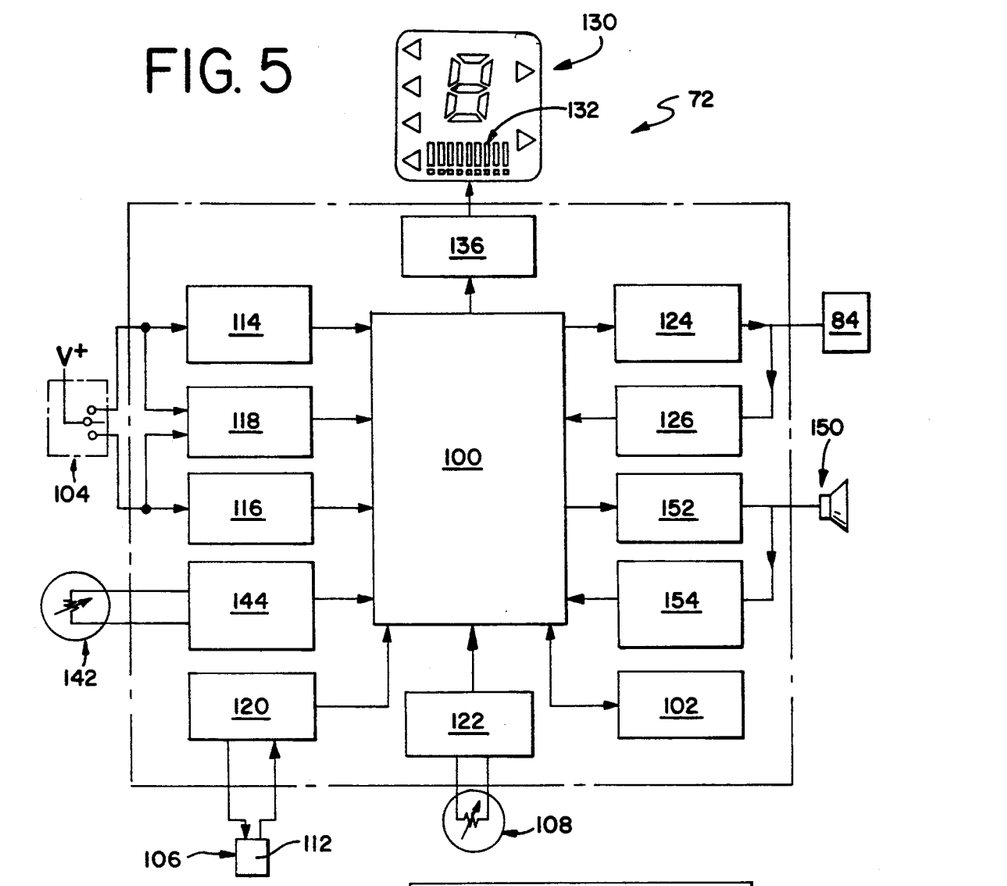
FIG. 5 is a block diagram of the electronic circuitry associated with the lubrication system.

The lubricant controller 72 controls the pressurized lubricant source 68 and regulates the amount or level of lubricant provided to the harvesting units thereby providing the harvesting units with an operational cycle having a predetermined duration measured as a function of the lubricant amounts provided to the harvesting unit component parts requiring lubrication. As shown in FIG. 5, the controller 72 includes a microprocessor 100 with suitable memory means 102 and which receives and computes information from several different inputs. The controller 72 is connected to a source of power, such as the battery on the harvester. Controller 72 receives inputs from a harvesting unit cyclic monitor 106. Moreover, the controller 72 receives inputs from a time adjustment control 108, such as a potentiometer or the like, which is settable by the operator.

In a preferred form of the invention, a switch assembly 104 is located in the cab region (not shown) of the harvester and is settable to condition the controller 72 into various modes of operation. In the illustrated embodiment, switch assembly 104 includes a manually settable rocker switch 110 which can be set to an "Automatic" position and "Off" position or a "Manual Start" position. In its "Automatic" position, switch 110 conditions the controller to automatically initiate a lubrication cycle after the harvesting mechanisms of the harvesting units have been operated for a predetermined duration. In its "Manual Start" position, switch 110 acts as a momentary contact switch which activates the pressurized lubrication source 68 for a predetermined period of time. Albeit movable to a "Manual Start" position, switch 110 automatically returns to its "Automatic" position upon release of the switch 110 by the operator. In its "Off" position, switch 110 inhibits activation of the lubrication cycle. When switch 110 is set to an "OFF" position, the lubrication system of the present invention provides a signal to inform the operator that a lubrication cycle is required based on the cumulative cyclic operation of the harvesting mechanisms.

The cyclic monitor 106 includes a sensor 112 arranged on at least one of the harvesting units adjacent the periphery of the monitoring sprocket 60 (FIG. 3). Sensor 112 monitors operation of the harvesting mechanism and produces an output used to count the number of rotations of the harvesting mechanism during cyclic operation thereof.

The time adjustable control 108 serves a dual purpose. First, the control 108 is used to set the length of time of operation of the pressurized lubrication source 68. Second, the control 108 selects the cumulative number of cycles to be performed by the harvesting mechanisms within an operational cycle of the harvesting units and between lubrication cycles. As used herein, the terminology "operational cycle for the harvesting units" equals a predetermined number of continuous or accumulated intermittent operations of the harvesting mechanisms.

Turning again to FIG. 5, controller 72 includes suitable circuitry 114 which conditions the microprocessor 100 when the switch assembly 104 is set in a "Manual Start" position. Controller 72 also includes suitable circuitry 116 for conditioning the microprocessor 100 when the switch assembly 104 is set in an "Off" position. Signal conditioning circuitry 118 is also provided in conjunction with controller 72 for detecting fault signals from the switch assembly 104 and for conditioning the microprocessor 100 for "Automatic" mode of operation when the switch assembly 104 is set in neither its "Manual" or "Off" positions.

Controller 72 further includes circuitry 120 connected between cyclic monitor 106 and the microprocessor 100. Circuitry 120 allows the signals received from monitor 112 to be converted into a count indicative of the operation of the harvesting units and more particularly revolutions of the harvesting mechanism of the harvesting units.

The control mechanism 108 is connected to the microprocessor 100 through suitable programmable circuitry 122. The programmability of circuitry 122 sets the duration of the lubricant cycle and furthermore sets the operational cycle of the harvesting units between lubrication cycles. With the present invention, both the duration of the lubrication cycle and the duration of the operating cycle for the harvesting units between the lubrication cycles can be modified depending upon particular harvesting conditions.

As will be appreciated from the above, initiation of a lubrication cycle will commence upon energization of relay 84 associated with the pressurized lubricant source 68. Relay 84 is responsive to signals received from the microprocessor 100 of the controller 72 through suitable output circuitry 124. Signal conditioning circuitry 126 is provided in combination with circuitry 124 for detecting faults in the system.

A salient feature of the present invention relates to a display for providing the harvester operator a quick and readily available visual indication representative of the cyclic operations of the harvesting mechanisms remaining in the operational cycle of the harvesting units before another lubrication cycle is due to be commenced. In the illustrated embodiment, an indicator assembly 130 responsive to the controller 72 is arranged in the cab region of the harvester for providing a visual display indicative of the continuous and/or accumulated intermittent operations of the harvesting mechanisms of the harvesting units relative to the operating cycle of the harvesting units.

Figure 6:
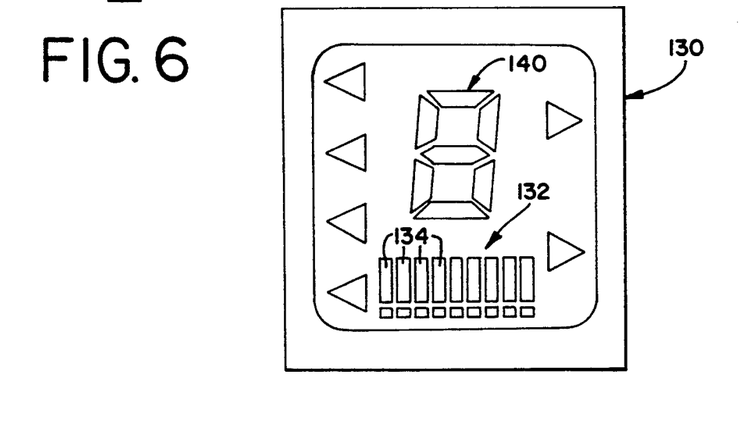
FIG. 6 is a schematic plan view representation of a display providing an indication of the operating condition of the lubrication system.

In the illustrated embodiment, and as shown in FIG. 6, indicator assembly 130 includes a display 132 for graphically illustrating the continuous and/or cyclic operations of the harvesting mechanism since the last lubrication cycle, and the cyclic operations of the harvesting mechanisms remaining until the next lubrication cycle is to be commenced. The display 132 can take many forms for indicating the full extent of an operational cycle of the harvesting units beginning with a first location or point whereat the harvesting mechanisms are fully lubricated and have not yet commenced operation and a second location or point whereat the lubricant has been exhausted from the lubricated mechanisms and a lubrication cycle is due to be commenced.

Preferably, the display 132 is in the form of a bar graph which increases proportionately as the operation cycles of the harvesting mechanisms accumulate during a harvesting operation. As will be discussed hereinafter, the graphical display 132 will likewise decrease proportionately in response to the operation of the lubrication source 68 thereby yielding a visual estimate of the harvesting mechanism's operational duration based on the lubricant provided thereto.

The bar graph 132 is preferably comprised of a series of a illuminable elements 134 arranged in side-by-side order relative to each other. The controller 72 further includes suitable driver circuitry 136 interposed between indicator assembly 130 and the microprocessor 100 for operating the display 132 in a manner yielding a visual indication of continuous or cumulative intermittent operational cycles of the harvesting mechanisms relative to the operational cycle of the harvesting units. As will be appreciated, controller 72 progressively illuminates adjacent elements 134 in proportion to the extent of cyclic operations of the harvesting mechanisms during the operational cycle of the harvesting units.

As shown in FIG. 6, indicator assembly 130 may further include a display 140 for visually indicating operational performance of the lubrication system during a harvesting procedure. Display 140 preferably includes an LCD digital display of the type capable of portraying different forms of indicia thereon. The indicia visible on the display 140 represents a particular condition of the lubrication system. The display 140 is likewise connected to the microprocessor 100 of controller 72 through the driver circuitry 136.

Returning to FIG. 4, the lubrication system 66 of the present invention also includes a pressure sensor 142 which monitors pressure levels in the distribution system 70 leading from pump assembly 74 to the harvesting units. As shown in FIG. 5, sensor 142 is connected to the microprocessor 100 of controller 72 through suitable circuitry 144 which conditions the outputs of sensor 142.

The lubrication system according to the present invention further includes an alarm 150 operated from the microprocessor 100 through suitable alarm circuitry 152. Signal conditioning circuitry 154 detects faults in the signals provided to operate alarm 150. In the illustrated embodiment, alarm 150 emits an audible signal to alert the harvester/operator to particular conditions of the lubrication system of the harvester.

During operation of the harvester, the cyclic monitor 106 detects rotation of the harvesting mechanisms 22, 24 of the harvesting units. The output of the sensor 112 of monitor 106 is received by circuitry 120 and computed into a count by the microprocessor 100 of controller 72. As will be appreciated, the harvesting units of the harvester are often times intermittently operated for different duty cycles during an operational cycle of the harvester. An advantage of the present invention being that the cumulated cyclic operations of the harvesting mechanisms are computed and stored in the memory 102 of the microprocessor 100.

When switch assembly 104 of the lubrication system conditions the microprocessor for an "Automatic" mode of operation, the pressurized lubricant source 68 of the lubrication system automatically initiates a lubrication cycle after the harvesting units have been operated for the duration of the operational cycle. The predetermined number of cycles set for an operational cycle of the harvesting unit is programmable through circuitry 122. The amount of lubricant provided by the pressurized source of lubricant 68 is correlated to the operational cycle of the harvesting units by operating the lubricant source 68 for a predetermined period of time. As will be appreciated, the operation of the lubricant source 68 is likewise programmable through the circuitry 122. Thus, the amount of lubricant provided to the harvesting mechanisms is correlated to the operational cycle of the harvesting units thereby assuring appropriate amounts of lubricant are provided to the grease receiving areas by the lubrication system of the present invention during a lubrication cycle.

A unique feature of the present invention is the ability to readily modify the length of the operation cycle of the harvesting units and the lubrication cycle to suit operator preference, machine requirements, or other variables. With the present invention, display 132 of indicator assembly 130 provides a visual indication of the cumulative or summed cyclic operations of the harvesting mechanisms as related to the operational cycle of the harvesting units thus allowing the operator to gauge remaining harvesting operation time before lubrication of the harvesting mechanisms would normally be required. With the present invention, the display 132 graphically increases proportionately as cycles of the harvesting mechanisms are accumulated during machine operation. This gives the operator the assurance that the lubrication system is working and allows the operator to estimate when the lubrication cycle should be or will be initiated.

The lubrication system 66 of the present invention is configured to provide the operator with a choice of allowing the lubrication cycle to be automatically initiated by setting switch assembly 104 to the "Automatic" position or to allow the operator to personally gauge when the lubrication cycle is to be commenced by setting the switch assembly 104 to a "Manual Start" position. As explained above, the "Manual" position of switch assembly 104 acts as a momentary contact which initiates the lubrication cycle and then automatically shifts the microprocessor into the "Automatic" mode of operation for the lubrication cycle. Thus, upon energization of the lubrication cycle, as through movement of switch assembly to a "Manual Start" position, the source of pressurized lubricant 68 is operated for a predetermined period of time as set by the circuitry 122.

Once the lubrication cycle has begun, the display 132 on indicator assembly 130 decreases proportionately back to its initial position as the lubricant is flowing to the harvesting mechanisms. The proportional decrease in the display 132 provides the operator with an assurance that the system is operating and the ability to tell when the lubrication cycle is approaching completion. The decrease in the display 132 furthermore provides an estimate of how much lubricant has been dispersed during the lubrication cycle.

Alternatively, the switch assembly 104 may be set to an "Off" position. When set to an "Off" position, the lubricant controller 72 is conditioned to inhibit initiation of the lubrication cycle of the pressurized lubrication source 68. Although the switch assembly 104 is set to an "Off" position, display 132 of indicator assembly 130 provides a visual indication of the cumulative operating time for the harvesting mechanisms. By setting the switch assembly 104 to an "Off" position, the operator is assured that the lubrication cycle will not commence at an undesirable time during the harvesting procedure. When the switch 104 is set to an "Off" position and the harvesting mechanisms have operated for the durational limit of the operational cycle of the harvesting unit, the alarm 150 will sound to alert the operator that a lubrication cycle is required.

Display 140 on the indicator assembly 130 provides a visual indication of the operational performance of the lubrication system. The pressure sensor 142 in the lubricant distribution system 70 determines if lubricant is flowing properly to the harvesting units or if a blockage occurs in the distribution system 70 thus preventing a flow of lubricant to the harvesting units. Proper fluid flow is determined by sensing the normal range of pressure within the distribution system and indicating a fault on the display 140 if the pressure is either too high or too low. This fault indication can be in the form of a digital display and an audible alarm. The display 140 will likewise visually indicate or portray a fault if the lubricant pressure source 68 is inoperative or if there is an electrical problem with the switch assembly 104. Likewise, the display 140 will portray indicia indicative of defect or fault with the audible alarm 150. As will be appreciated, the LCD digital display 140 allows different indicia to be visually portrayed for different faults within the system. Thus, the display 140 has the unique advantage of monitoring performance of the lubrication system as well as informing the operator through the indicia on the digital display 140 where a particular fault or defect within the lubrication system has occurred.

The lubrication system of the present invention provides a simple and effective mechanism for providing appropriate quantities of lubricant to each of the harvesting units based on the operational requirements of the particular lubricated mechanisms during an operating procedure of the mechanism. Moreover, the lubrication system of the present invention eliminates the need for manual lubrication of multiple grease receiving areas and thus reduces the time involved in lubricating the harvesting units. Furthermore, the indicator assembly 130, forming part of the lubrication system 66, provides the operator with the ability to adjust the length of the operation cycle of the harvesting units to suit performance of the machine, machine requirements, and other variables that may occur during a harvesting procedure. Furthermore, the lubrication system of the present invention provides a display 140 for indicating operating performance of the lubrication system throughout operation of the harvester, thus reducing downtime and possible wear of the parts due to faults in the lubrication system.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

What is claimed is:

1. A lubrication system for a cotton harvester having a plurality of harvesting units, each harvesting unit including operable mechanisms which are selectively and intermittently operable for various duty cycles during a harvesting procedure of the cotton harvester, said lubrication system comprising:

a lubricant reservoir;

a lubricant pump having an input connected to the reservoir and an output connected to each of the harvesting units such that pressurized lubricant is provided to the operable mechanisms thereon;

lubricant control means including means for measuring cyclic operations of the operable mechanisms during the harvesting procedure of the cotton harvester and operative means arranged in combination with the measuring means for enabling operation of said pump for a predetermined period of time such that the lubricant provided to said operable mechanisms during a lubrication cycle is correlated to the lubricant usage of the operable mechanisms during cyclic operations of the harvesting units; and display means responsive to said control means for providing a visual indication representative of the cyclic operations of the operable mechanism accumulated since the last lubrication cycle during which the operable mechanisms of the harvest units were lubricated.

2. The lubrication system according to claim 1 wherein the operative means of said lubricant control means includes manually settable means for conditioning the control means into either automatic or manual modes of operation.

3. The lubrication system according to claim 1 wherein said display means includes means for graphically representing accumulated cyclic operations of the operable mechanisms.

4. The lubrication system according to claim 2 further including means for providing an audible alarm when a lubrication cycle is to be performed.

5. A lubrication system for a cotton harvester having a plurality of harvesting units, each harvesting unit including lubricated mechanisms which are intermittently operated and whose accumulated intermittent operations define an operational cycle having a predetermined duration measured as a function of the lubricant amounts provided to the lubricated mechanisms, said lubrication system comprising:

lubrication means operable during a lubrication cycle to supply substantially equivalent amounts of lubricant under pressure to corresponding lubricated mechanisms on the harvesting units;

means for computing accumulated intermittent operations of said lubricated mechanisms during the operation cycle and for initiating a lubrication cycle whose duration is correlated to the lubricant usage of the lubricated mechanisms during the operation cycle of the harvester; and means for visually indicating the accumulated intermittent operations of the lubricated mechanisms relative to the operation cycle of the harvester.

6. The lubrication system according to claim 5 wherein said lubrication system further includes operative means for adjusting the duration of the lubrication cycle and thereby changing the duration of the operation cycle of the lubricated mechanisms.

7. The lubrication system according to claim 5 wherein said lubrication means includes a lubricant reservoir mounted on the harvester and a lubricant pump connected to the reservoir and to each of the harvesting units for providing pressurized lubricant thereto.

8. The lubrication system according to claim 7 further including programmable means for setting the pump operation time and thereby selecting the amount of lubricant provided to the lubricated mechanisms thus selecting the duration of operation time for the harvester.

9. A lubrication system for a cotton harvester having a plurality of harvesting units mounted thereon, each harvesting unit including a rotatable harvesting mechanism which is cyclically operated for a predetermined duration measured as a function of the lubricant provided thereto, said lubrication system comprising:

a pressurized source of lubricant;

lubricant distribution means for simultaneously delivering substantially equivalent amounts of lubricant from the lubricant source to each of the harvesting mechanisms;

lubricant control means for controlling operation of the lubricant source, said control means including first operative means for monitoring and summing cyclic operations of at least one of the harvesting mechanisms during a harvesting procedure of the cotton harvester and second operative means for enabling operation of the lubricant source for a predetermined period of time and such that lubricant amounts provided to the harvesting mechanisms is correlated to the summed cyclic operations of the harvesting mechanisms during a harvesting procedure; and display means for visually indicating the summed cyclic operations of the harvesting mechanisms as related to the predetermined duration of the harvesting mechanisms thus allowing the operator to gauge remaining harvesting operation time before lubrication of the harvesting mechanisms would normally be required.

10. The lubrication system according to claim 9 wherein the source of lubricant includes a lubricant reservoir arranged in combination with a pump assembly, an inlet to the pump assembly being connected to the lubricant reservoir and an outlet of the pump assembly being connected to the lubricant distribution means.

11. The lubrication system according to claim 10 wherein said pump assembly includes a gear pump powered by a hydraulically driven motor.

12. The lubrication system according to claim 11 wherein said lubrication control means includes means for changing operational times of the hydraulically driven motor thereby modifying the amounts of lubricant delivered to the harvesting mechanisms such that the operational duration of the harvesting mechanisms can be customized to harvester operational requirements.

13. The lubrication system according to claim 9 wherein said display means includes a bar graph which increases proportionately as the operation cycles of the harvesting mechanisms accumulate during a harvesting operation.

14. The lubrication system according to claim 13 wherein said bar graph decreases proportionately in response to the operation of the lubricant source thereby yielding a visual estimate of the amount of lubricant provided thereto.

15. The lubrication system according to claim 9 wherein said lubrication system further includes means for monitoring pressure levels within said lubricant distribution means, said monitoring means being connected to display means for providing a visual indication of operational performance of the lubrication system during a harvesting procedure.

16. A lubrication system for a cotton harvester having a plurality of harvesting units, each harvesting unit including lubricated mechanisms which are intermittently operated and whose accumulated intermittent operations define an operational cycle having a predetermined duration measured as a function of the lubricant amounts provided to the lubricated mechanisms, said lubrication system comprising:

lubrication means operable during a lubrication cycle to supply lubricant under pressure to the lubricated mechanisms on the harvesting units;

means for computing accumulated intermittent operations of said lubricated mechanisms during the operation cycle and for operating said lubrication means in a manner providing predetermined amounts of lubricant to the lubricated mechanisms during a lubrication cycle of the harvester; and means for indicating the full extent of an operational cycle of the lubricated mechanisms beginning with a first position whereat the lubricated mechanisms are fully lubricated and have not yet commenced operation and a second position whereat lubricant has been substantially exhausted from the lubricated mechanisms, said indicating means providing a visual display indicative of the accumulated intermittent operations of the lubricated mechanisms relative to the full extent of the lubricated mechanisms' operational cycle.

* * * * *